United States Patent [19]

Wagner et al.

[11] Patent Number: 4,756,105

[45] Date of Patent: Jul. 12, 1988

[54] DISPLAY MEANS COMPRISING CONTACTING DISPLAY ELEMENT

[75] Inventors: Egbert Wagner, Barbing; Hans Kinzler, Regensburg, both of Fed. Rep. of Germany

[73] Assignee: Siemens Aktiengesellschaft, Berlin and Munich, Fed. Rep. of Germany

[21] Appl. No.: 9,451

[22] Filed: Feb. 2, 1987

[30] Foreign Application Priority Data

Feb. 28, 1986 [DE] Fed. Rep. of Germany ... 8605562[U]

[51] Int. Cl.⁴ .............................................. G09F 9/00
[52] U.S. Cl. ....................................... 40/448; 350/334
[58] Field of Search ............... 40/448, 452; 340/784; 350/334; 368/242, 84

[56] References Cited

U.S. PATENT DOCUMENTS

| | | | |
|---|---|---|---|
| 3,718,842 | 2/1973 | Abbott, III et al. | 350/334 |
| 3,910,029 | 10/1975 | Yamazaki | 368/242 |
| 3,922,051 | 11/1975 | Reynolds | 350/334 |
| 4,422,728 | 12/1983 | Andreaggi | 350/334 |

*Primary Examiner*—Robert Peshock
*Assistant Examiner*—Cary E. Stone
*Attorney, Agent, or Firm*—Hill, Van Santen, Steadman & Simpson

[57] ABSTRACT

The invention is based on the object of executing the contacting and fastening of a display element, particularly for a LCD (liquid crystal display), with an arrangement that is simple to execute in terms of production engineering. The display element is illuminated from behind by a light box. To this end, a contact element is allocated to every contact of the display element, this contact element being fashioned as a punched sheet metal part and being secured in a contact receptacle of the light box.

9 Claims, 2 Drawing Sheets

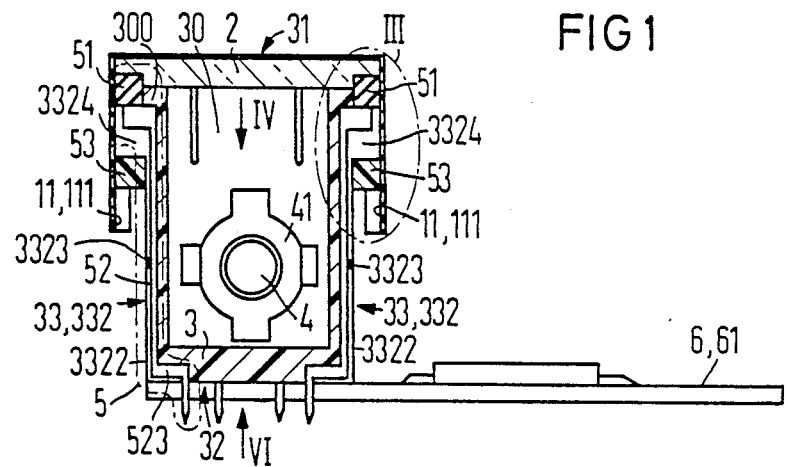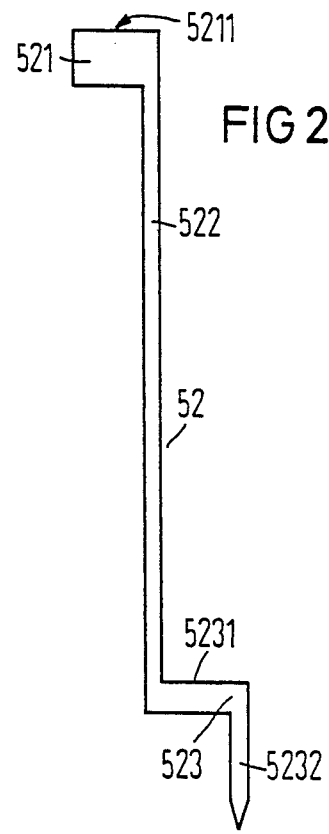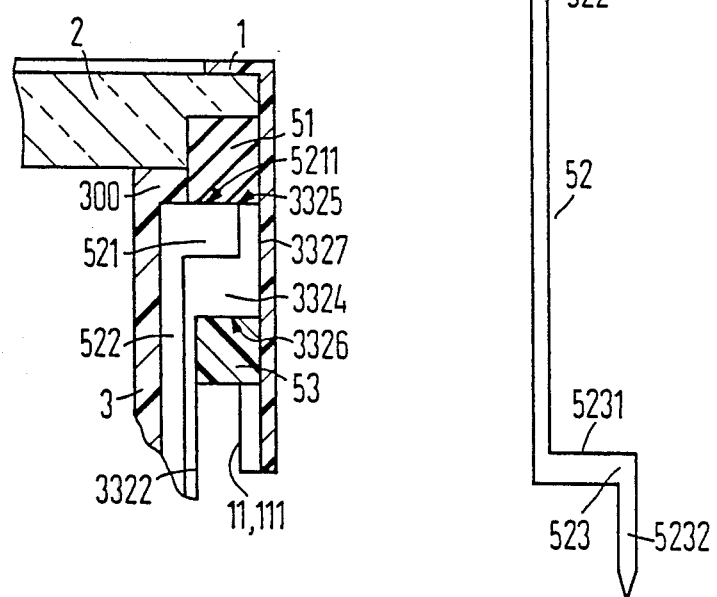

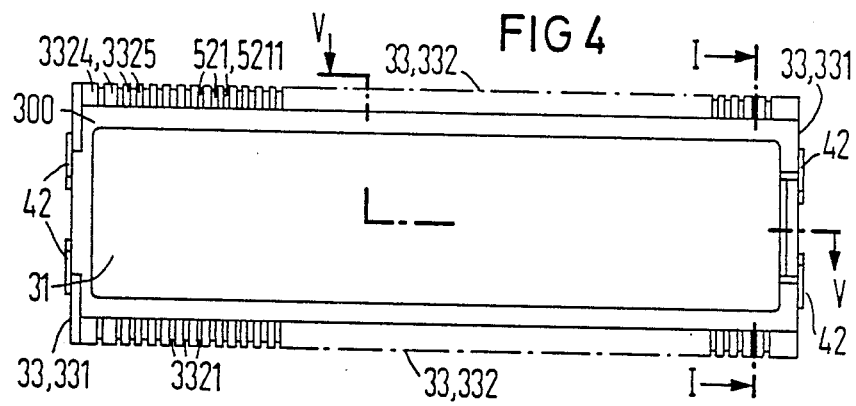
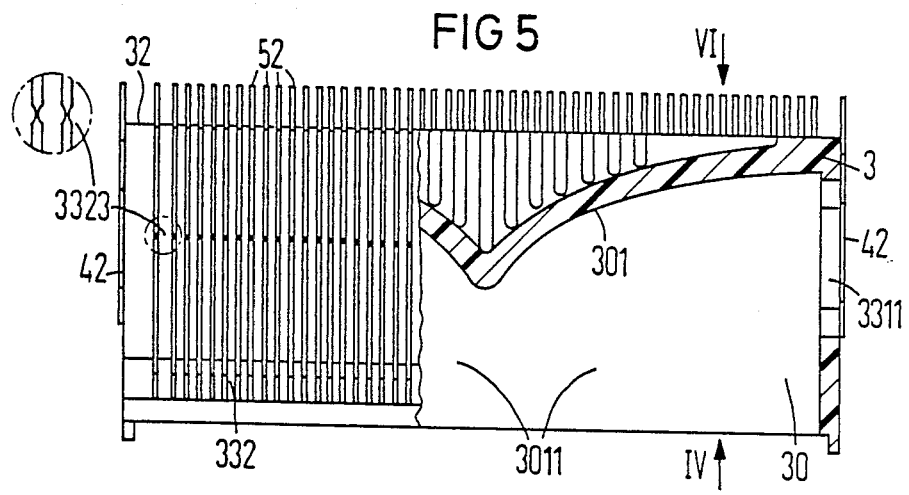
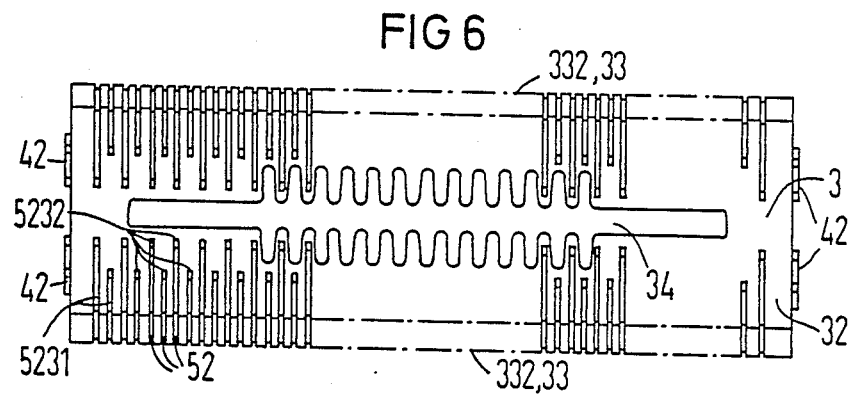

DISPLAY MEANS COMPRISING CONTACTING DISPLAY ELEMENT

BACKGROUND OF THE INVENTION

1. Field of the Invention

The invention is directed to a display means having a display, particularly an LCD, having an illumination means having a light box which is secured to the backside of the display element and which includes an outside and a connecting side proceeding at a right angle thereto, and a contacting means having a conductive rubber element and contact elements for the electrical connection of every contact of the display element to a contact foot at the connecting side.

2. Description of the Prior Art

In a display element, the print image should noticeably contrast with the background in order to guarantee optimum legibility for a user. For example, given an LCD, this is achieved by the uniformly intense transillumination of the transparent print image of the LCD with an illumination means.

In a known display means of this type, a light box with lamps is arranged at the backside of the display element for this purpose, this light box serving the purpose of illuminating the display element from behind. The electrical connection between the contact of the display element and contact feet at the connection side of the light box must therefore be conducted around the light box with the assistance of a contacting means. A flexible printed circuit board has been employed for this purpose and has been electrically connected to the display unit via a conductive rubber element.

In another known embodiment of the contacting means, contact springs have been injected into the walls of the light box for the connection between the contacts of the display element and the contact feet.

In both embodiments, guaranteeing that every contact of the display element is reliably connected to the respectively allocated contact foot behind the light box is possible only with considerable structural and manufacture-oriented outlay, particularly given a small contact clearance.

SUMMARY OF THE INVENTION

In a display means of the type identified above, it is therefore an object of the invention to simplify the connection between display element and contact feet both structurally and in terms of production engineering.

The solution of this object is provided by the improvement wherein the light box comprises a contact receptacle at its outside, the contact receptacle being provided per a contact element, being limited by partitions and a contact element being inserted there into.

Simultaneously guaranteed by the invention is that the contact elements are reliably insulated from one another by the contact receptacles of the light box, namely even given an extremely small spacing from one another (below 1.25 mm).

The contact elements of the contacting means and the contact feet are advantageously single-piece and punched from sheet metal panels. The shape of these sheet metal punched parts in the punching plane and perpendicular thereto depends on the shape of the contact receptacles which can be arbitrarily arranged at the outside of the light box.

One end of every contact element has a contact maker having a contact surface and is expediently fashioned such that plugged into a contact receptacle of the light box it projects somewhat therefrom and serves as a stop for the conductive rubber element.

The contact foot at the other end of the contact element has the function of producing a reliable and fast connection to a connector unit. When, for example, the display means is to be soldered to a printed circuit board, it is expedient to fashion it in the form of a plurality of such solder feet. However, the contact foot can also be fashioned as a plug foot when a corresponding plug in the connector unit is allocated to it.

Every contact element has a joining piece between the contact foot and contact maker, the length of this joining piece depending on the depth of the light box.

It is expedient to fix the contact elements in the contact receptacles of the light box with friction forces. The contact receptacles and the contact elements are therefore preferably fashioned such that the adhesion friction between contact receptacles and inserted contact elements suffices in order to retain the contact element. However, a latched connection or a glued connection between the contact elements and the contact receptacles can also be provided.

The partitions between the contact receptacles preferably project beyond the contact elements; at least one retaining nose can then serve the purpose of securing every contact element in a contact receptacle, this retaining nose being formed by thermal or mechanical pinching of the partition between two contact receptacles.

When the contacts at the display element are arranged at respectively two opposite sides, it is expedient to arrange the contact receptacles for the appertaining contact elements at two sides of the outside of the light box which lie opposite one another. As a result thereof, the advantage derives given inserted contact elements that the heat arising in the inside of the light box due to the lamps is dissipated better and that the light box and, thus, the overall display means is additionally stabilized by the elongated sheet metal punched parts.

The parts of the display means are held together mechanically by a tentor frame having a detent, this tentering frame being expediently supported against a stop step at the light box. The tentering frame has the additional function of maintaining an adequate contacting pressure between every contact maker of the contact element and the conductive rubber element as well as between the conductive rubber element and the display element. The stop can be fashioned as a continuous line or can also be resolved into individual stop points; it can also be fashioned as a snap-in-part, as a bead, or as a hinged-in or bent-in tab.

When the stop of the tentering frame is resolved into individual stop points, a pressure member is expediently inserted between the stop steps of the light box and these stop points, for example, the tabs of the tentering frame. A uniform pressure distribution onto the stop step of the light box is thereby obtained.

BRIEF DESCRIPTION OF THE DRAWINGS

The invention shall be set forth in greater detail below on the basis of an exemplary embodiment. Shown are:

FIG. 1 is a cross-section through the display means along the line I—I in FIG. 4.

FIG. 2 is a side view of a contact element.

FIG. 3 is an enlarged portion III from FIG. 1.

FIG. 4 is a front view of the light box with inserted contact elements shown in the direction of the arrow IV in FIGS. 1 and 5.

FIG. 5 is a view of the light box in the direction of the arrow V in FIG. 4, partially cut along the section line V in FIG. 4.

FIG. 6 is a rear view of the light box in the direction of the arrow VI in FIGS. 1 and 5.

DESCRIPTION OF THE PREFERRED EMBODIMENTS

The display means is essentially composed of a light box 3, of an LCD 2, of a contacting means 5 and of a tentering frame 1 which holds all of the parts together (FIG. 1).

The cuboid-shaped light box 3 is a molded plastic part. At its front sides, the light box 3 has a window 31 which is framed by the frame 300 (view in FIG. 4). At its backside, the light box is closed by a connecting side 32 (FIG. 6). The remaining four sides form the outside 33 of the light box 3 comprising two narrow sides 331 lying opposite one another and two broad sides 332 lying opposite one another.

The interior 30 of the light box 3 is fashioned as a reflector 301 comprising two reflector chambers 3011. A lamp 4 with socket 41 is arranged in each reflector chamber 3011. The two lamps 4, together with their sockets 41, are introduced in the interior 30 of the light box 3 through openings 3311 in the narrow sides 331 of the light box 3. Two contacts 42 are riveted to every narrow side 331 of the light box 3, these contacts 42 serving the purpose of contacting the lamps 4 and leading to the connecting side 32.

The two opposed broad sides 332 of the outside 33 of the light box 3 are identically fashioned. Each broadside 332 has a stop step 3324 which proceeds parallel to the frame 300 of the light box 3. Slot-shaped contact receptacles 3321 are fashioned on the broad-sides 332 at a right angle relative to the stop steps 3324. The contact receptacles 3321 thereby penetrate through the stop steps 3324 and terminate roughly flush with the end face 3325 of the stop steps 3324. The contact receptacles 3321 are arranged at a regular spacing from one another which corresponds to the grid dimension of the contacts of the LCD 2. Partitions 3322 are arranged between the contact receptacles 3321.

The contact receptacles 3321 extend from the broad sides 332 to the connecting side 32. Neighboring contact receptacles 3321 are fashioned differing in length there.

In order to save materials in the manufacture, the light box 3 has a recess 34 (FIG. 6).

Every contact element 52 is fashioned as a punched sheet metal part. FIG. 2 shows the broad sides of such a punched sheet metal part. It is composed of an elongated joining piece 522 which is fashioned between a contact maker 521 and a contact foot 523. The contact maker 521 projects from the joining piece 522 at a right angle.

The contact foot 523 of the contact elements 52 is composed of a solder foot carrier 5231 which joins the joining piece 522 at a right angle and is further composed of a pointed solder foot 5232 which likewise joins the solder foot carrier 5231 at a right angle and which is aligned parallel to the joining piece 522. The contact receptacles 3321 of the light box 3 are aligned such that the broad sides (FIG. 2) of every plugged-in contact element 52 reside perpendicular to the broad sides 332 or, respectively, to the connecting side 32 of the light box 3.

For the purpose of fastening the contact elements 52 inserted into the contact receptacles 3321, retention noses 3323 are fashioned at the partitions 3322 between the contact receptacles 3321, these retention noses 3323 fixing the contact elements 52 in the contact receptacles 3321. To this end, the partitions 3322 between the contact receptacles 3321 project somewhat beyond the inserted contact elements 52 so that a reliable overlap of the contact elements 52 by the retention noses 3323 is assured in a manufacturing step for the broad sides 332 of the light box 3.

The LCD 2 is clamped between the frame 300 of the light box 3 and the tentering frame 1. The stop 11 which is composed of a plurality of bent-in tabs 111 of the tentering frame 1 thereby presses against the metallic pressure members 53 arranged parallel to the stop steps 3324. These pressure members 53 are clamped between the stop 11 of the tentering frame 1 and the pressure face 3326 of the stop step 3324. The pressure of the stop 11 of the tentering frame 1 is thereby uniformly distributed onto the stop steps 3324 of the light box 3. The clamping of the LCD 2 between the frame 300 of the light box 3 and the frame 1 is therewith assured. The contact makers 521 of the contact elements 52 are arranged between the stop steps 3324 of the light box 3. The stop steps 3324 thereby project somewhat beyond the contact makers 521. The end faces 3325 are set back somewhat in comparison to the contact faces 5211 of the contact makers 521. The upper sides 3327 of the stop steps 3324 contact the metallic tentering frame 1.

The contact between the contacts of the LCD 2 and the contact makers 521 of the contact elements 52 is assured by an elongated conductive rubber element 51 conducted parallel to the stop step 3324 per broad side 332 of the light box 3. The contacting pressure between the contact faces 5211 of the contact makers 521 and the conductive rubber elements 51 and between the conductive rubber elements 51 and the contacts of LCD 2 required for contacting is guaranteed by the clamping of the conductive rubber elements 51 between the LCD 2 and the stop steps 3324 of the light box, this clamping being exerted by the tentering frame 1 (FIG. 3).

The display means has its solder feet 5232 soldered to a connecting unit 6 of a printed circuit board 61.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. Display means comprising:
   a display element with contacts, particularly an LCD (liquid crystal display);
   an illumination means having a light box which is secured to a backside of said display element and which includes an outside and a connecting side proceeding at a right angle thereto;
   a contacting means having a conductive rubber element and contact elements for the electrical connection of every contact of said display element to a contact foot at said connecting side; and comprising the improvement wherein said light box includes at least one contact receptacle at its outside, a contact receptacle being provided for each contact element and being bordered by partitions, and a contact element being inserted into said contact receptacle.

2. A display means according to claim 1, wherein said contact elements are plugged into said contact receptacles of said light box and fixed therein by friction forces.

3. A display means according to claim 1, wherein said partitions project somewhat beyond said contact elements and a retention nose which at least partially embraces said contact element is formed at a location on said partition.

4. A display means according to claim 3, wherein every contact element and the apertaining contact foot is fashioned as a punched sheet metal part having broad sides which has a contact maker having a contact face at one end; in that said contact maker is connected to said contact foot via a joining piece and in that said broad sides of every contact element reside at a right angle relative to said outside of said light box.

5. A display means according to claim 4, wherein said contact foot is composed of a solder foot carrier and of at least one solder foot, in that said solder foot carrier is arranged at a right angle at one end of said joining pieces and in that said solder foot is arranged at a right angle at said solder foot carrier.

6. A display means according to claim 5, wherein the solder foot carriers of contact elements neighboring one another differ in length; and in that the contact receptacles for said solder foot carriers extend into said connecting side proceeding from said outside of said light box.

7. A display means according to claim 6, wherein said contact receptacles are arranged at respectively two opposite sides of said outside of said light box.

8. A display means according to claim 1, wherein said light box has a respective stop step at each of two sides of said outside which lie opposite one another; and in that a tentering frame is provided, said tentering frame extending beyond said display element and being supported against said stop step with a stop.

9. A display means according to claim 8, wherein a pressure member is arranged between the stop step and the stop.

* * * * *